(12) United States Patent
Antoo et al.

(10) Patent No.: US 8,831,980 B2
(45) Date of Patent: Sep. 9, 2014

(54) METHOD AND SYSTEM FOR LOADING AND RELOADING PORTABLE CONSUMER DEVICES

(75) Inventors: Nizam Antoo, San Carlos, CA (US); Chris Britt, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 12/985,870

(22) Filed: Jan. 6, 2011

(65) Prior Publication Data

US 2011/0161185 A1 Jun. 30, 2011

Related U.S. Application Data

(63) Continuation of application No. 11/404,651, filed on Apr. 14, 2006, now Pat. No. 7,886,969.

(60) Provisional application No. 60/748,141, filed on Dec. 6, 2005.

(51) Int. Cl.
| | |
|---|---|
| *G06Q 20/00* | (2012.01) |
| *G06Q 20/28* | (2012.01) |
| *G06Q 20/10* | (2012.01) |
| *G06Q 20/20* | (2012.01) |
| *G07F 7/10* | (2006.01) |
| *G06Q 40/00* | (2012.01) |
| *G06Q 20/06* | (2012.01) |

(52) U.S. Cl.
CPC .............. *G06Q 20/28* (2013.01); *G06Q 20/10* (2013.01); *G06Q 20/20* (2013.01); *G07F 7/1008* (2013.01); *G06Q 20/105* (2013.01); *G06Q 40/00* (2013.01); *G06Q 20/0658* (2013.01)
USPC .................. 705/17; 705/16; 705/41; 705/38; 705/39; 235/380

(58) Field of Classification Search
USPC ........................................................... 705/17
See application file for complete search history.

(56) References Cited

U.S. PATENT DOCUMENTS

| | | | |
|---|---|---|---|
| 5,302,811 A | 4/1994 | Fukatsu | |
| 5,465,206 A | 11/1995 | Hilt et al. | |

(Continued)

FOREIGN PATENT DOCUMENTS

| | | |
|---|---|---|
| JP | 2002-318980 A | 10/2002 |
| JP | 2003-141428 A | 5/2003 |

(Continued)

OTHER PUBLICATIONS

Patiwat Panurach, Money in Electronic Commerce: Digital Cash, Electronic Fund Transfer and Ecash, Jun. 1996, Communications of ACM, vol. 39, No. 6.*

(Continued)

*Primary Examiner* — M. Thein
*Assistant Examiner* — Milena Racic
(74) *Attorney, Agent, or Firm* — Kilpatrick Townsend & Stockton LLP (57) ABSTRACT

A method is disclosed. The method includes providing tender at a point of service terminal operated by a load agent, the point of service terminal being in operative communication with a payment processing network. The point of service terminal thereafter sends a transaction authorization request to an issuer of a portable consumer device to be used by a user. The issuer then authorizes or does not authorize the transaction authorization request. If the transaction authorization request is approved, the portable consumer device is either initially loaded or reloaded with an amount associated with the tender provided at the point of service terminal.

20 Claims, 3 Drawing Sheets

(56) References Cited

U.S. PATENT DOCUMENTS

| | | |
|---|---|---|
| 5,557,516 A | 9/1996 | Hogan |
| 5,616,902 A | 4/1997 | Cooley et al. |
| 5,621,640 A | 4/1997 | Burke |
| 5,644,118 A | 7/1997 | Hayashida |
| 5,754,655 A | 5/1998 | Hughes et al. |
| 5,870,456 A | 2/1999 | Rogers |
| 5,920,847 A | 7/1999 | Kolling et al. |
| 5,987,439 A | 11/1999 | Gustin et al. |
| 6,000,608 A | 12/1999 | Dorf |
| 6,012,637 A | 1/2000 | Hirokawa et al. |
| 6,032,859 A | 3/2000 | Muehlberger et al. |
| 6,088,682 A | 7/2000 | Burke |
| 6,112,191 A | 8/2000 | Burke |
| 6,167,387 A | 12/2000 | Lee-Wai-Yin |
| RE37,122 E | 4/2001 | Levine et al. |
| 6,298,366 B1 | 10/2001 | Gatherer et al. |
| 6,330,978 B1 | 12/2001 | Molano et al. |
| 6,374,231 B1 | 4/2002 | Bent et al. |
| 6,473,500 B1 | 10/2002 | Risafi et al. |
| 6,502,745 B1 | 1/2003 | Stimson et al. |
| 6,606,606 B2 | 8/2003 | Starr |
| RE38,255 E | 9/2003 | Levine et al. |
| 6,805,287 B2 * | 10/2004 | Bishop et al. .................. 235/379 |
| 6,829,588 B1 | 12/2004 | Stoutenburg et al. |
| 6,999,569 B2 | 2/2006 | Risafi et al. |
| 7,024,389 B1 | 4/2006 | Watkins |
| 7,089,200 B2 | 8/2006 | Bode |
| 7,191,939 B2 * | 3/2007 | Beck et al. ..................... 235/380 |
| 7,334,724 B2 | 2/2008 | Pallares |
| 8,086,539 B2 * | 12/2011 | Nauman et al. .................. 705/64 |
| 8,595,074 B2 * | 11/2013 | Sharma et al. ................... 705/21 |
| 2002/0035539 A1 | 3/2002 | O'Connell |
| 2002/0194124 A1 | 12/2002 | Hobbs et al. |
| 2003/0001005 A1 * | 1/2003 | Risafi et al. .................... 235/380 |
| 2003/0053609 A1 | 3/2003 | Risafi et al. |
| 2003/0061153 A1 | 3/2003 | Birdsong et al. |
| 2003/0212796 A1 * | 11/2003 | Willard .......................... 709/227 |
| 2004/0111361 A1 | 6/2004 | Griffiths et al. |
| 2004/0153399 A1 | 8/2004 | Wilkes |
| 2004/0225545 A1 | 11/2004 | Turner et al. |
| 2004/0267595 A1 | 12/2004 | Woodings et al. |
| 2005/0033677 A1 | 2/2005 | Birdsong et al. |
| 2005/0080678 A1 | 4/2005 | Economy et al. |
| 2005/0125300 A1 * | 6/2005 | McGill et al. .................... 705/21 |
| 2005/0177496 A1 | 8/2005 | Blagg et al. |
| 2005/0251467 A1 | 11/2005 | Sato |
| 2005/0269415 A1 | 12/2005 | Licciardello et al. |
| 2006/0104426 A1 * | 5/2006 | Cataldi ........................ 379/114.2 |
| 2006/0115797 A1 | 6/2006 | Gray |
| 2006/0149569 A1 | 7/2006 | Lal et al. |
| 2006/0167794 A1 | 7/2006 | Crowell et al. |
| 2006/0200397 A1 | 9/2006 | Jasperse et al. |

FOREIGN PATENT DOCUMENTS

| | | |
|---|---|---|
| JP | 2004-171527 A | 6/2004 |
| JP | 2005-512163 A | 4/2005 |
| JP | 2005-242895 A | 9/2005 |
| KR | 2007-0059893 A | 6/2007 |
| RU | 2180761 C2 | 12/1998 |
| WO | WO 95/21427 A1 | 8/1995 |
| WO | WO 01/09851 A1 | 2/2001 |
| WO | WO 2005/020029 A2 | 3/2005 |

OTHER PUBLICATIONS

U.S. Appl. No. 11/404,651, filed Apr. 14, 2006.

U.S. Appl. No. 11/668,918, filed Jan. 30, 2007.

U.S. Appl. No. 11/695,499, filed Apr. 2, 2007.

U.S. Appl. No. 11/848,475, filed Aug. 31, 2007.

"automated teller machine"; Collins English Dictionary. London: Collins, 2000. Credo Reference [online]. [retrived on Mar. 12, 2009]. Retrieved from: http://www.credoreference.com/entry/2619529/.

"tender." The Penguin English Dictionary. London: Penguin, 2007. Credo Reference [online]. [retrived on Mar. 12, 2009]. Retrieved from: http://www.credoreference.com/entry/8509792/.

"thereafter." Collins English Dictionary. London: Collins, 2000. Credo Reference [online]. [retrived on Mar. 13, 2009]. Retrieved from: http://www.credoreference.com/entry/2701460/.

"Welcome to Green.com"; http://www.green.com/green/landing, 1 page (printed May 15, 2006; copyright 2004, 2005).

Office Action from U.S. Appl. No. 11/848,475, dated Mar. 18, 2009.

Office Action from U.S. Appl. No. 11/848,475, dated Nov. 13, 2009.

CFR Online:, "Online Payment Processing Definitions", http://web.archive.org/web/20051129104200/http://www.cfronline.org/orc/toolbox/oppd.html, archive date Nov. 11, 2005.

Caskey, et al.; "Is the Debit Revolution Finally Here?", Fourth Quarter 1994, *Economic Review*, vol. 79, No. 4, pp. 79-95.

Lin, C.; "Regulating the cross-border movement of prepaid cards"; 2008, *Journal of Money Laundering Control*, vol. 11, No. 2, pp. 146-171.

Search/Examination Report dated May 11, 2011 from Russian Patent Application No. 2008127393/09 together with English language translation, 12 pages.

Office Action in Chinese Application No. 200680045910.5, dated Feb. 2, 2012.

International Search Report and Written Opinion from PCT/US2008/074289, dated Mar. 24, 2009.

Office Action in Chinese Application No. 200680045910.5, dated Oct. 11, 2010.

"The prepaid card which can be used by credit card infrastructure: 'plastic donation and card are developed' in the industry first"; *CardWave*; Nov. 18, 2004; p. 36; vol. 17. (as translated.

Office Action issued in Japanese Patent Application No. 2008-544345, mailed Jun. 22, 2012, 6 pages total.

Examination Report mailed May 10, 2011 in related Australian Application No. 2006323098, 2 pages.

Examination Report mailed Jun. 12, 2012 in related Australian Application No. 2008296592, 2 pages.

\* cited by examiner

METHOD AND SYSTEM FOR LOADING AND RELOADING PORTABLE CONSUMER DEVICES

CROSS-REFERENCES TO RELATED APPLICATIONS

This application is a continuation of U.S. patent application Ser. No. 11/404,651, filed Apr. 14, 2006, which claims the benefit of the filing date of U.S. Provisional Patent Application No. 60/748,141, filed on Dec. 6, 2005, both of which are herein incorporated by reference in their entirety for all purposes.

BACKGROUND OF THE INVENTION

Prepaid card products have achieved a critical level of industry, marketplace and consumer acceptance and usage. They can now be considered a stand-alone payment category. The growth of these cards and related transaction volumes has been accelerated by the emergence of new participants (issuers and processors). The new participants use non-standard platforms, applications, devices and connectivity protocols. Despite the increased number of participants, the non-standard implementations of such prepaid card systems by the various new participants have actually limited the broad-based usage (activation, load and settlement) of such prepaid card products.

One commonly used prepaid card is the Starbucks™ card. The Starbucks™ card can be loaded or reloaded with value, but only in Starbucks™ stores. The Starbucks™ prepaid card cannot be used in other stores such as grocery stores.

While prepaid cards such as these are useful, a number of improvements can be made. For example, some have expressed concerns about possible fraudulent use and possible money laundering. Since prepaid cards like the Starbucks™ type cards are not tied to their owners and are like cash, it is difficult to monitor their usage. Also, like cash, if a Starbucks™ type prepaid card is lost, the finder of the card can simply use the card. The true card owner cannot retrieve the lost value on the card. Lastly, with respect to the Starbucks™ type of prepaid card, one cannot go to another merchant such as McDonald's™ to load or reload the prepaid card with value. Prepaid cards of this type can only be used by the companies that issue them.

Another type of conventional prepaid card can be used at different merchants, and is initially purchased at a store. Money is paid to the store clerk and the consumer takes the card home. To load the card, the consumer calls a phone number to load the card and to link the load transaction to the card. The money is moved a few days (typically 2-5 days) later to the issuer of the card and the card is ready for use.

There are also a number of drawbacks associated with this type of transaction. First, the clearing and settlement process takes a fairly significant amount of time. As noted above, the clearing and settlement process can take between 2 and 5 days, which is quite long. Second, the activation process for the prepaid card is quite complex. Multiple steps are needed just to activate the card. Third, for each merchant that wants to participate in the system, a separate data feed needs to be established between the merchant and the system. This is cumbersome and costly and limits participation in the system.

It would be desirable to provide for methods and systems that use prepaid portable consumer devices, such as prepaid cards. The methods and systems would increase the number of participating merchants, issuers, acquirers, and consumers. The methods and systems would also preferably use a payment processing network that uses standardized methods and rules. The methods and systems may also allow an owner of a prepaid card to potentially regain the value associated with a lost card, and to allow for the monitoring of prepaid card transactions.

Embodiments of the invention address the above problems, and other problems, individually and collectively.

SUMMARY OF THE INVENTION

Embodiments of the invention are directed to methods and systems that allow for the initial loading and/or reloading of portable consumer devices with value, using a payment processing network that is configured to process credit and debit card transactions.

One embodiment of the invention is directed to a method comprising: providing tender at a point of service terminal operated by a load agent, the point of service terminal being in operative communication with a payment processing network, wherein the point of service terminal thereafter sends a transaction authorization request to an issuer of a portable consumer device to be used by a user and wherein the issuer thereafter authorizes or does not authorize the transaction authorization request; receiving at the point of service terminal, an indication that the transaction authorization request has been approved or not approved; and if the transaction authorization request has been approved, the portable consumer device is either initially loaded or reloaded with an amount associated with the tender provided at the point of service terminal.

Another embodiment of the invention is directed to a method comprising: sending a transaction authorization request to an issuer of a portable consumer device to be used by a user from a point of service terminal operated by a load agent after receiving tender from a user, wherein the issuer thereafter authorizes or does not authorize the transaction authorization request, and wherein the point of service terminal is in operative communication with a payment processing network; receiving at the point of service terminal, an indication that the transaction authorization request has been approved or not approved; and if the transaction authorization request has been approved, the portable consumer device is either initially loaded or reloaded with an amount associated with the tender provided at the point of service terminal.

Another embodiment of the invention is directed to a method comprising: receiving a transaction authorization request associated with a portable consumer device to be used by a user from a point of service terminal operated by a load agent after receiving tender from the user, wherein an issuer of the portable consumer device thereafter authorizes or does not authorize the transaction authorization request, and wherein the point of service terminal is in operative communication with a payment processing network; and sending a transaction response message to the point of service terminal, wherein the transaction response message indicates whether or not the transaction authorization request is approved or not approved.

Another embodiment of the invention is directed to a method comprising: receiving tender associated with a portable consumer device at a point of service; and at the point of service, loading or reloading the portable consumer device with an amount associated with the presented tender using a payment processing network, the payment processing network being in communication with an issuer of the portable consumer device.

Another embodiment of the invention is directed to a system comprising: a portable consumer device; a point of service terminal, the portable consumer device adapted to interface with the point of service terminal; a payment processing network in communication with the plurality of point of service terminals; and a server computer residing in or in communication with the payment processing network, wherein the server computer is configured to load or reload the portable consumer device with an amount associated with a tender presented by a user of the portable consumer device, after responding to an authorization request to load or reload the portable consumer device.

Another embodiment of the invention is directed to a method comprising: receiving amounts associated with aggregated tenders associated with loading or reloading portable consumer devices at various load agents; and participating in clearing and settlement process, wherein in the clearing and settlement process, amounts owed to the issuers of the portable consumer devices are sent to the issuers.

These and other embodiments of the invention are described in further detail below.

DETAILED DESCRIPTION

Embodiments of the invention enable issuers of prepaid card programs to sell, activate, load and/or re-load value on a portable consumer device at various merchant and agent locations. An existing, broad based payment processing system can be used to efficiently authorize and settle such prepaid card transactions. By using an existing payment processing system that is already in communication with various POS (point of service) terminals, consumers can load or reload their portable consumer devices with value at merchant locations that can process ordinary credit or debit card transactions.

As a point of quantification, the very largest of today's prepaid card issuers has at the very most 100,000 sales and load locations. By using an existing payment processing network (e.g., VisaNet) and existing POS terminals, the number of potential load and load agents would number in the millions. Consumers would therefore have much greater access to load and load agents, thereby guaranteeing increased usage.

As suggested in the Background of the Invention section above, conventional prepaid card programs typically have specific connectivity requirements as well as proprietary processing and settlement terms. In comparison, embodiments of the invention can use standardized connectivity and message formats for supporting prepaid card purchase transactions. The connectivity and message formats that are used can be of the type that are used in typical commercial credit or debit card transactions. By using standardized connectivity and message formats, a complete and seamless sale, load and transaction settlement capability can be achieved. In addition, because an existing payment processing network can be used, issuer, acquirer and agent start-up, and ongoing operating costs are reduced.

As will be apparent from the discussion below, embodiments of the invention have a number of other advantages. For example, because embodiments of the invention use a pre-existing payment processing network, the issuer is provided with a "guarantee" of good funds. Also, by using an existing payment processing network, same-day settlement for reload purchases is possible. In comparison, as noted above, a conventional prepaid card program may have a 2 to 5 day settlement window. Further, the real time aspect of embodiments of the invention provides the consumer with immediate access to funds. In comparison, many alternative issuer/processor payment processing networks require a user to complete several activation steps before using a prepaid card. The user's ability to use the card is therefore delayed and it can be some time from the actual time of purchase.

Furthermore, by using a pre-existing payment processing network, participation in the systems and methods according to embodiments of the invention is completely voluntary. Issuers can also control and specify the prepaid card products that can be purchased, loaded and re-loaded by consumers at specific load locations (merchants and agents). Acquirers can establish/specify participating load locations and negotiate appropriate transaction terms and agreements.

Figure 1:
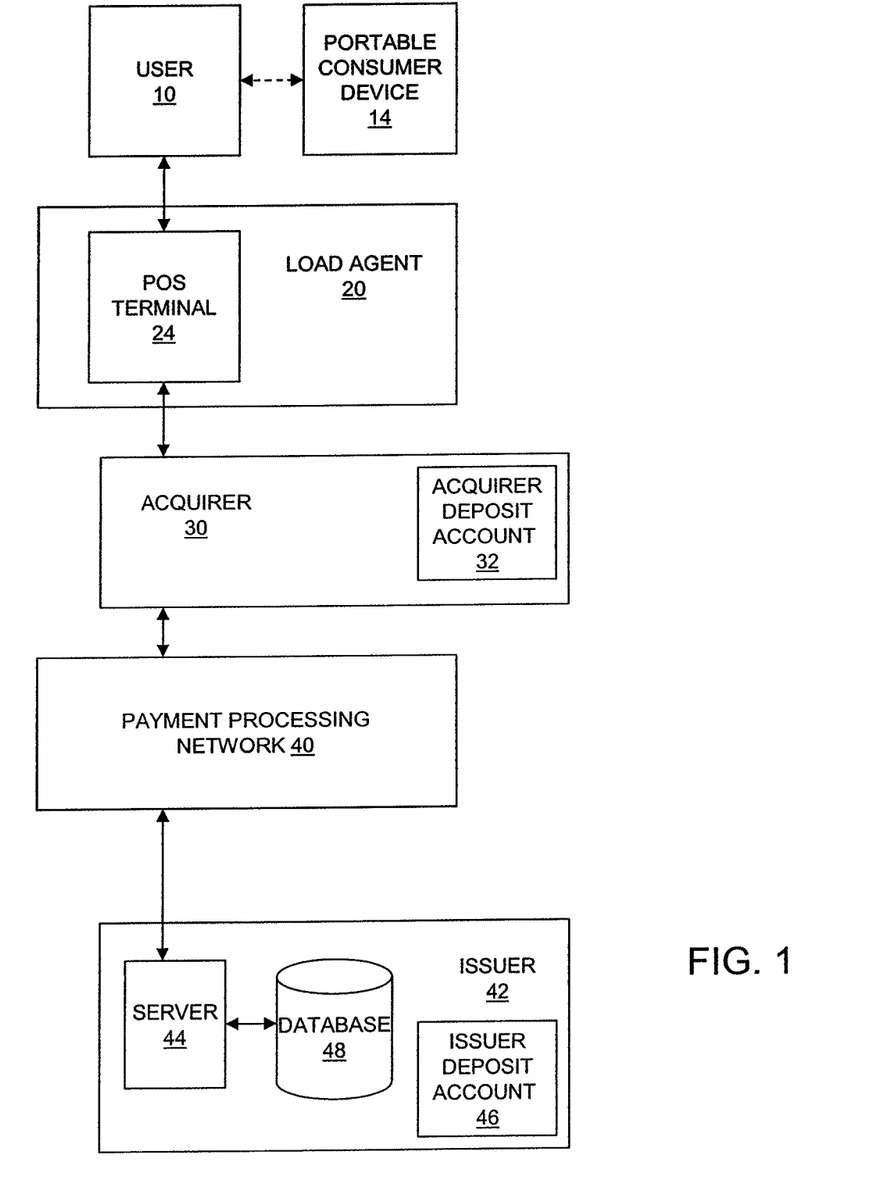
FIG. 1 a block diagram of a system according to an embodiment of the invention.

FIG. 1 shows a system according to an embodiment of the invention. Other systems according to embodiments of the invention may include fewer or more components than are specifically shown in FIG. 1.

FIG. 1 shows a user 10, a load agent 20, an acquirer 30, a payment processing network 40, and an issuer 42. The acquirer 30 and issuer 42 can communicate through the payment processing network 40. The load agent 20 includes at least one point of service (POS) terminal 24 and can communicate with the acquirer 30, the payment processing network 40, and the issuer 42.

The user 10 may also be a consumer of goods and/or services. The user 10 may be associated with (e.g., use) a portable consumer device 14 such as a prepaid card.

Although prepaid cards are discussed in detail, embodiments of the invention may encompass more than just prepaid cards. Embodiments of the invention may include any suitable portable consumer device. For example, the portable consumer devices can be hand-held and compact so that they can fit into a consumer's wallet and/or pocket (e.g., pocket-sized). Examples of portable consumer devices may include cellular phones, personal digital assistants (PDAs), pagers, payment cards, payroll cards, security cards, access cards, smart media, transponders, and the like. The portable consumer devices may interface with point of service (POS) terminals using any suitable mechanism including any suitable electrical, magnetic, or optical interfacing system. For example, a contactless system such as an RF (radio frequency) device recognition system or contact system such as a magnetic stripe may be used to interface with a POS terminal containing a contactless reader or a magnetic stripe reader, respectively.

The portable consumer device 14 may also include a volatile or non-volatile memory to store information such as the cardholder's primary account (PAN) number, name, and other information. Load value data may also be stored in the memory in the portable consumer device 14. Alternatively or additionally, load value data may be stored in a database 48 associated with the issuer 42 along with the account number associated with the portable consumer device 14. Changing monetary values associated with the portable consumer device 14 may be retained solely in the database 48 so that the portable consumer device 14 could simply store basic information including the account number associated with the portable consumer device 14.

The load agent 20 can be one of many load agents in a system. For example, the load agent 20 may be a merchant with one or multiple POS terminals. Exemplary load agents can include drugstores, grocery stores, gas stations, hardware stores, etc. Unlike conventional prepaid card load systems, in embodiments of the invention, the load agents can include businesses that do not have any affiliation with each other, and may simply be any number of business that have normal POS terminals that are configured to process credit card transactions.

The load agent 20 may also have any suitable number and/or type of POS terminals. In FIG. 1, one POS terminal 24 is shown for simplicity of illustration. Suitable POS terminals include stand-alone kiosks, check-out lanes or check-out counters at merchants, etc. Suitable POS terminals may include terminals that are configured to process normal credit or debit card transactions. The POS terminals may have optical, electrical, or magnetic readers that can read data from portable consumer devices such as prepaid cards.

As shown in FIG. 1, the system may include an acquirer 30 and an issuer 42. The acquirer 30 may be a bank that is associated with the load agent 20. It may have one or more acquirer deposit accounts 32. The issuer 42 may have a server computer 44, as well as a database 48, and at least one issuer deposit account 46.

The server computer 44 is typically a powerful computer or cluster of computers. For example, the server computer can be a large mainframe, a minicomputer cluster, or a group of servers functioning as a unit. In one example, the server computer may be a database server coupled to a web server.

As used herein, an "acquirer" is typically a business entity, e.g., a commercial bank that has a business relationship with a particular merchant. An "issuer" is typically a business entity (e.g., a bank) which issues a portable consumer device such as a credit or debit card to a consumer. Some entities can perform both issuer and acquirer functions. Embodiments of the invention encompass such single entity issuer-acquirers. Additional details about various elements including issuers, acquirers, etc. can be found in U.S. patent application Ser. No. 11/266,766, which is herein incorporated by reference in its entirety.

The payment processing network 40 may comprise or use a payment processing network such as VisaNet™. The payment processing network 40 and any communication network that communicates with the payment processing network 40 may use any other suitable wired or wireless network, including the Internet. The payment processing network 40 may be adapted to ordinary process debit or credit card transactions, in addition to processing transactions associated with the loading and/or reloading of value on portable consumer devices.

For simplicity of illustration, one user 10, one load agent 20, one branch terminal 24, one acquirer 30, and one issuer 42 are shown. However, it is understood that in embodiments of the invention, there can be multiple users, load agents, branch terminals, issuers, as well as server computers, deposit accounts, etc.

Figure 2:
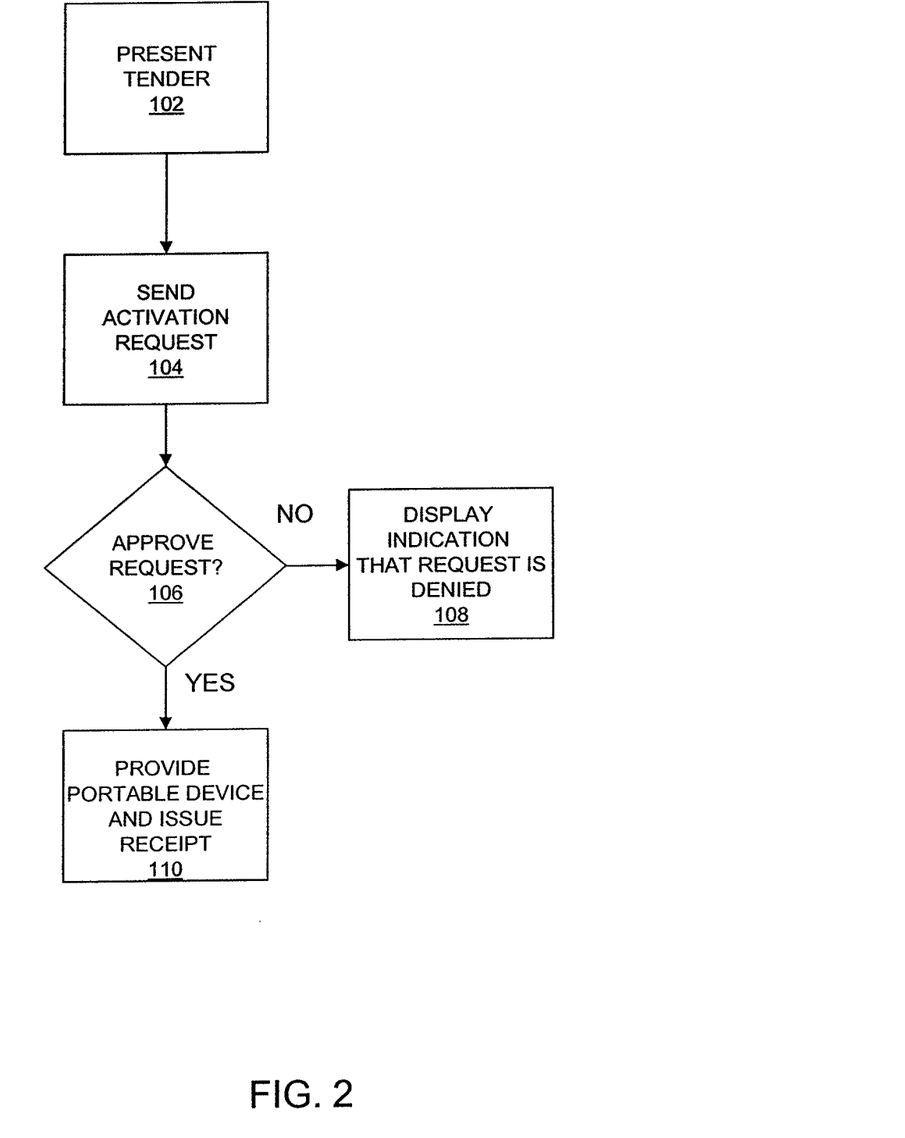
FIG. 2 shows a flowchart illustrating some steps in an initial loading process according to an embodiment of the invention.

FIG. 2 shows a high level flowchart of a method of initially loading a prepaid card according to an embodiment of the invention. Other methods according to other embodiments of the invention can have more or fewer steps. Referring to both FIGS. 1 and 2, a user 10 can first provide (e.g., present) tender (e.g., cash, check, or card) to a load agent 20 (step 102). The load agent 20 can be a merchant who sells goods. The presented tender can be used to initiate an initial load of a portable consumer device 14. The load agent 20 may optionally charge a fee for the load agent's service.

After receiving the tender, the load agent 20 processes the tendered payment and swipes/scans the portable consumer device 14 at the POS terminal 24 and initiates a transaction authorization request to the load agent's acquirer 30 (step 104). The transaction authorization request may be an initial load authorization request (e.g., to ask for authorization to effect an initial load of the portable consumer device 14). After receiving the transaction authorization request, the acquirer 30, which is typically a bank associated with the load agent 20, routes the transaction authorization request to the payment processing network 40. The payment processing network 40 then routes the transaction authorization request to the issuer 42 for approval.

The transaction authorization request can include a specific code in a "processing code, transaction type" data field that indicates that the transaction being conducted is a "prepaid load" transaction, instead of a normal debit or a credit card transaction. The transaction authorization request can have other information including network identification codes, a primary account number, a transaction amount, an acquirer code, an issuer code, etc.

After the issuer receives the transaction authorization request, the issuer 42 then takes action to verify the card account, approve or decline the request, and increment the value associated with the portable consumer device 14 (step 106). The user's card file, which may be stored in a database 48, may be updated as appropriate. Some or all of this processing may be performed by a server computer 44 operated by and/or located at the issuer 42. The server computer 44 stores records of the transaction may be stored in the database 48. Alternatively or additionally, one or more server computers in or associated with the payment processing network 40 or the acquirer 30 could be used to store transaction data.

The issuer 42 then sends a response message (e.g., a load response message) to the payment processing network 40. The payment processing network 40 then forwards the response message to the acquirer 30, and the acquirer 30 forwards the load response message to the load agent 20. The load agent POS terminal 24 then receives the response message.

If the transaction is approved, then the load agent 20 provides the portable consumer device 14 to the user 10 (step 110). The portable consumer device 14 is updated with an initial load amount associated with the tender initially provided by the user 10. The actual update may occur within a memory within the portable consumer device 14 and/or in a database 48 at the issuer 42, or some other entity. A receipt may be provided to the user 10 and the receipt may show an updated card balance and other transaction details. The user 10 may then use the portable consumer device 14 immediately after loading the portable consumer device 14 with value.

If the transaction is not approved, then a display may show, or a receipt may be printed by the POS terminal indicating that the transaction request was denied (step 108).

Thus, the POS terminal 24 is in operative communication with the payment processing network 40, and sends a transaction authorization request to an issuer 42 of the portable consumer device 14 to be used by a user 10. The issuer 42 thereafter authorizes or does not authorize the transaction authorization request. The transaction authorization request may be an initial load request or a reload request (as explained below). A response message is received at the POS terminal 24, and indicates whether or not the transaction authorization request has been approved or not approved. If the transaction authorization request has been approved, the portable consumer device 14 is loaded with an initial load amount (or reloaded amount) associated with the tender provided at the point of service.

An amount associated with the tender can include an amount equal to the tendered amount, or an amount that is related to the tendered amount. For example, in the latter case, the load agent may obtain a fee (e.g., 2% of the tendered amount) for conducting the transaction and the initially loaded or reloaded amount may be 98% (or less) of the tendered amount, optionally minus any additional fees required by the acquirer 30, issuer 42, or operator of the payment processing network 40 to conduct the transaction. The amount associated with the tender may be added to any existing amounts associated with the portable consumer device 14.

Figure 3:
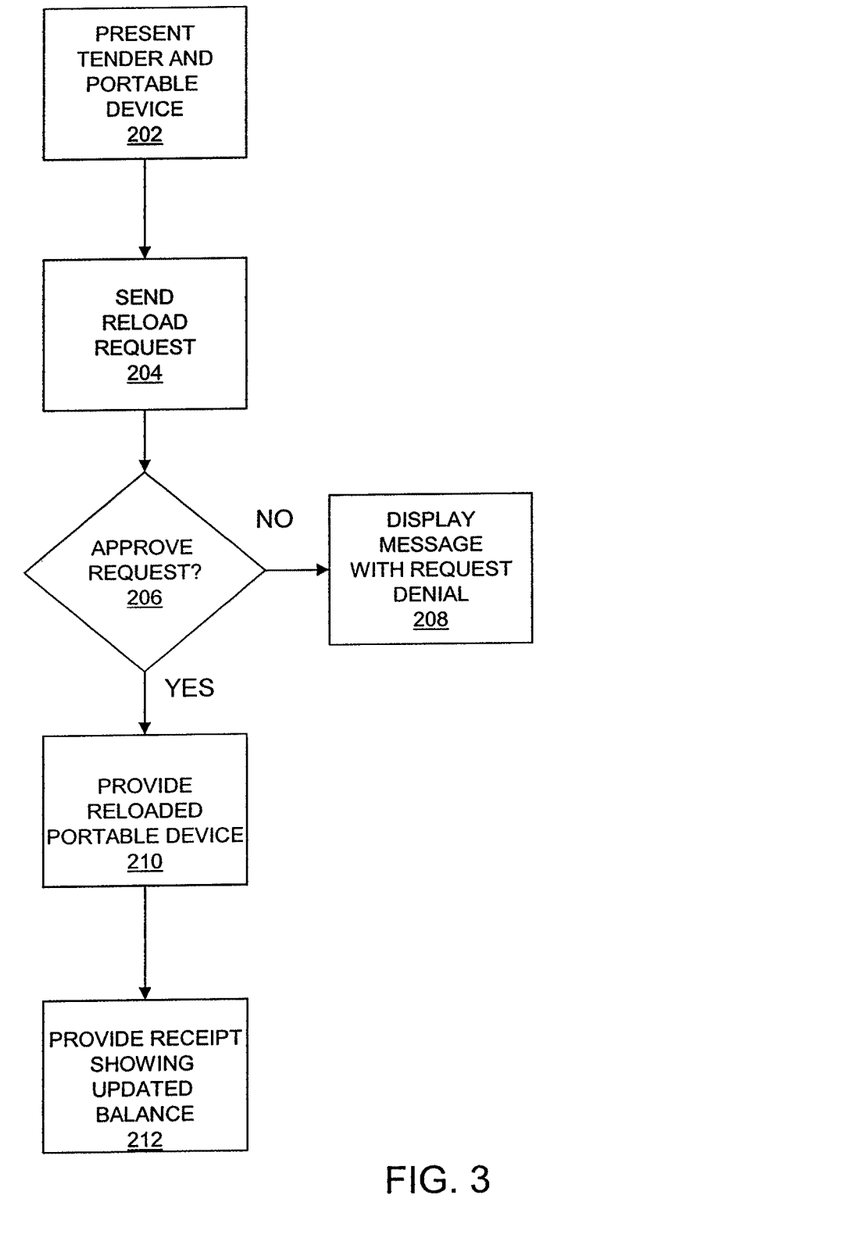
FIG. 3 shows a flowchart illustrating some steps in a reload process according to an embodiment of the invention.

FIG. 3 shows a high level flowchart of a method of reloading a portable consumer device 14 according to an embodiment of the invention. Other methods according to other embodiments of the invention can have more or fewer steps. Referring to both FIGS. 1 and 3, a consumer can first present tender (e.g., cash, check, or card) and a portable consumer device 14 to a load agent 20 (step 202). The presented tender can then be used to reload portable consumer device 14 with value.

After receiving the tender, the load agent 20 processes the tendered payment and swipes/scans the portable consumer device 14 at the POS terminal 24 and initiates a transaction authorization request to the load agent's acquirer 30 (step 204). The transaction authorization request may be a reload authorization request (e.g., to ask for authorization to reload the user's portable consumer device 14). After receiving the transaction authorization request, the acquirer 30 routes the transaction authorization request to the payment processing network 40. The payment processing network 40 then routes the transaction authorization request to the issuer 42.

The issuer 42 then takes action to verify the card account, approve or decline the request, increment card value and update the user's card file as appropriate (step 206). Some or all of this processing may be performed by a server computer 44 operated by and/or located at the issuer 42, and records of the transaction may be stored in the database 48.

The issuer 42 then sends a reload response message to the payment processing network 40. The payment processing network 40 then forwards the reload response message to the acquirer 30, and the acquirer 30 forwards the response message to the load agent 20. The load agent POS terminal 24 receives the response message.

If the transaction is approved, then the load agent 20 provides the portable consumer device 14 to the user 10 (step 210). The portable consumer device 14 is updated with an additional amount of value associated with the tender provided by the user 10. The update may occur in a memory in the portable consumer device 14, and/or in a database 48 associated with the issuer 42, or some other entity. A receipt may be provided to the user 10 and the receipt may show an updated card balance and other transaction details (step 212).

If the transaction is not approved, then a display may show, or a receipt may be printed by the POS terminal indicating that the transaction request was denied (step 208).

After obtaining the portable consumer device 14 with an initially loaded or reloaded value, the user 10 may use the portable consumer device 14 at any suitable merchant that is in communication with the payment processing network 40. The new merchant, could be, but does not have to be, the same load agent 20. The newly loaded or reloaded portable consumer device can be used immediately after the portable consumer device 14 is loaded or reloaded with value.

After the user 10 tenders funds and after the above-noted transactions are authorized, a settlement and interchange process is performed. Referring to FIG. 1, the load agent 20 makes funds available to the acquirer 30. The amount available includes the total of amounts associated with approved load transactions. Approved load transactions include initial loads and reloads. Thus, tenders from various consumers are aggregated, and an amount associated with the aggregated tenders is sent to an acquirer 30. The acquirer 30 thereafter participates in a clearing and settlement process with the payment processing network and various issuers. During the clearing and settlement process, net amounts owed between the various issuers and acquirers in communication with the payment process network 40 are settled by the payment processing network 40.

Then, the payment processing network 40 effects net settlements with the acquirer 30, and debits the acquirer 30 for an amount due to the issuer 42 for approved load transactions, and credits the acquirer 30 for interchange. The acquirer's deposit account 32 is updated accordingly. The payment processing network 40 also effects net settlement with the issuer 42, and credits the issuer 42 for the amount of approved load transactions, and debits the issuer for interchange.

The acquirer 30 can maintain a file of previously approved load transactions. The payment processing network 40 provides a file to the acquirer 30 of all transactions that have been settled by the payment processing network 40. The issuer's deposit account 46 is then updated accordingly. The payment processing network 40 sorts all of the settlement records and routes the transactions to the appropriate issuer(s), and the issuer 42 maintains a file of previously approved load transactions.

In the above example, funds originate from the user 10, and are then transferred to the load agent 20, acquirer 30, and then to the issuer 42. The transfer of funds is different than what might occur in a normal credit card transaction. In a normal credit card transaction, funds are transferred from the issuer 42, acquirer 30, and then to the merchant who may have sold goods to a user.

Advantageously, in embodiments of the invention, the initial load and re-load transaction authorization process, and the transaction settlement and interchange process can occur within one day. This is a much shorter timeframe than the 2-5 days provided by conventional prepaid card systems.

Embodiments of the invention provide a number of other advantages. For example, in embodiments of the invention, a user may load or reload a portable consumer device with value at any merchant that is in communication with a payment processing network that is adapted to process normal credit or debit card transactions. Since special network feeds need not be supplied to load agents to participate, many merchants can participate as load agents. This makes the system convenient for the user, since the user has more potential load agents that can load the user's portable consumer device with value.

Also, as noted above, in embodiments of the invention, an authorization process is performed before a card is reloaded with value. This is done even though the user is presenting tender to the reload agent. As a result, the issuer of the portable consumer device can keep track of the user's transactions. This may be helpful if the user would like summary spending reports and/or to help identify potential fraud or money laundering if an abnormal number or amount of loads or reloads is occurring. In addition, if the portable consumer device is lost by the user, the user may notify the issuer that the portable consumer device is lost. Any subsequent transaction authorization requests associated with the lost portable consumer device can be denied, thereby preventing fraud and preventing the loss of value to the user.

Embodiments of the invention are also suitable for use with payroll cards. A payroll card is one type of portable consumer device. With a payroll card, a user's employer can put the user's payment amount for employment on a payroll card, instead of issuing a paycheck. Since amounts can be added or subtracted in the payroll card in embodiments of the invention, embodiments of the invention are particularly useful with payroll cards.

It is not intuitive to provide for an authorization process when loading or reloading a portable consumer device with value, since the user is presenting verified tender (e.g., cash) to the load agent and, in theory, there should be nothing to verify. However, as noted above, it is desirable to have an authorization process to prevent or minimize fraud and to provide some means for tracking the use of prepaid portable consumer devices.

The software components or functions described in this application, may be implemented as software code to be executed by one or more processors using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method of loading a portable consumer device, the method comprising:
    providing tender at a point of service terminal operated by a load agent, the point of service terminal being in operative communication with an acquirer associated with the load agent;
    transmitting, by the point of service terminal, a transaction authorization request to the acquirer,
    wherein the acquirer thereafter transmits the transaction authorization request to an issuer of the portable consumer device via a payment processing network configured to process debit and credit account transactions,
    wherein the transaction authorization request comprises a prepaid load transaction code in a data field that indicates that the transaction being conducted is a prepaid load transaction instead of a normal debit or a credit account transaction, and
    wherein the issuer thereafter generates a load response message indicating that the issuer authorizes the transaction authorization request;
    receiving, by the point of service terminal, the load response message from the acquirer, the load response message being transmitted from the issuer to the acquirer via the payment processing network; and
    loading or reloading, by the point of service terminal, the portable consumer device with an amount associated with the tender provided at the point of service terminal, the amount associated with the tender provided at the point of service terminal being less than the tendered amount, and at least a portion of the difference between the amount associated with the tender provided at the point of sale terminal and the tendered amount being receiving by the issuer of the portable consumer device from the acquirer via the payment processing network.

2. The method of claim 1 wherein the transaction authorization request is an initial load authorization request.

3. The method of claim 1 wherein the transaction authorization request is a reload authorization request.

4. The method of claim 1 wherein the load agent is one of a plurality of load agents operating various point of service terminals, wherein the point of service terminals are in operative communication with the payment processing network.

5. The method of claim 1 wherein the portable consumer device is a prepaid card.

6. The method of claim 1 wherein the portable consumer device is a payroll card.

7. The method of claim 1 wherein the load agent is a grocery store, and wherein the point of service terminal is a check-out lane.

8. The method of claim 1 wherein a transaction settlement and interchange process occur within one day.

9. The method of claim 1 wherein the portable consumer device is to be used by a user, and wherein the issuer updates a stored user file associated with the user.

10. The method of claim 1 wherein the portable consumer device comprises a memory storing load value data.

11. The method of claim 10 wherein the load value data is updated to reflect the amount associated with the tender provided at the point of sale terminal.

12. The method of claim 1 further comprising generating a receipt reflecting the amount associated with the tender provided at the point of service terminal.

13. A method of loading a portable consumer device, the method comprising:
    sending, by a point of service terminal operated by a load agent, a transaction authorization request to an acquirer associated with the load agent after receiving tender from a user,
    wherein the acquirer thereafter transmits the transaction authorization request to an issuer of the portable consumer device via a payment processing network configured to process debit and credit card transactions,
    wherein the transaction authorization request comprises a prepaid load transaction code in a data field that indicates that the transaction being conducted is a prepaid load transaction instead of a normal debit or a credit account transaction, and
    wherein the issuer thereafter generates a load response message indicating that the issuer authorizes the transaction authorization request;

receiving, by the point of service terminal, the load response message from the acquirer, the load response message being transmitted from the issuer to the acquirer via the payment processing network; and loading or reloading, by the point of service terminal, the portable consumer device with an amount associated with the tender received from the user, the amount associated with the tender received from the user being less than the tendered amount, and at least a portion of the difference between the amount associated with the tender received from the user and the tendered amount being received by the issuer of the portable consumer device from the acquirer via the payment processing network.

14. The method of claim 13 wherein the transaction authorization request is an initial load authorization request or a reload authorization request.

15. The method of claim 13 wherein the transaction authorization request is a reload authorization request.

16. The method of claim 13 wherein the load agent is one of a plurality of load agents operating point of service terminals, and wherein the point of service terminals are in operative communication with the payment processing network.

17. The method of claim 13 wherein the transaction authorization request further comprises a network identification code, an acquirer code, and an issuer code.

18. The method of claim 13 wherein at least a portion of the difference between the amount associated with the tender provided at the point of sale terminal and the tendered amount is received by the acquirer associated with the load agent.

19. A non-transitory computer readable medium comprising instructions executable by a processor for performing a method of loading a portable consumer device, the method comprising:

sending a transaction authorization request to an acquirer associated with a load agent after receiving tender from a user, wherein the acquirer thereafter transmits the transaction authorization request to an issuer of the portable consumer device via a payment processing network configured to process debit and credit account transactions, wherein the transaction authorization request comprises a prepaid load transaction code in a data field that indicates that the transaction being conducted is a prepaid load transaction instead of a normal debit or a credit account transaction, and wherein the issuer thereafter generates a load response message indicating that the issuer authorizes the transaction authorization request;

receiving the load response message from the acquirer, the load response message being transmitted from the issuer to the acquirer via the payment processing network;

loading or reloading the portable consumer device with an amount associated with the tender received from the user, the amount associated with the tender received from the user being less than the tendered amount, and at least a portion of the difference between the amount associated with the tender received from the user and the tendered amount being received by the issuer of the portable consumer device from the acquirer via the payment processing network.

20. A method of loading a portable consumer device, the method comprising:

providing tender at a point of service terminal operated by a load agent, the point of service terminal being in operative communication with an acquirer associated with the load agent;

transmitting, by the point of service terminal, a transaction authorization request to the acquirer, wherein the acquirer thereafter transmits the transaction authorization request to an issuer of the portable consumer device via a payment processing network configured to process debit and credit account transactions, wherein the transaction authorization request comprises a prepaid load transaction code in a data field that indicates that the transaction being conducted is a prepaid load transaction instead of a normal debit or a credit account transaction, and wherein the transaction authorization request further comprises a network identification code, a primary account number, a transaction amount, an acquirer code, and an issuer code, and wherein the issuer thereafter generates a load response message indicating that the issuer authorizes the transaction authorization request;

receiving, by the point of service terminal, the load response message from the acquirer, the load response message being transmitted from the issuer to the acquirer via the payment processing network; and loading or reloading, by the point of service terminal, the portable consumer device with an amount associated with the tender provided at the point of service terminal, the amount associated with the tender provided at the point of service terminal being less than the tendered amount, and at least a portion of the difference between the amount associated with the tender provided at the point of sale terminal and the tendered amount being received by the issuer of the portable consumer device from the acquirer via the payment processing network.

* * * * *

UNITED STATES PATENT AND TRADEMARK OFFICE
CERTIFICATE OF CORRECTION

PATENT NO. : 8,831,980 B2
APPLICATION NO. : 12/985870
DATED : September 9, 2014
INVENTOR(S) : Nizam Antoo et al.

Page 1 of 1

It is certified that error appears in the above-identified patent and that said Letters Patent is hereby corrected as shown below:

In the Claims

In column 10, line 19, in claim 1, delete "sale" and insert --service--

In column 10, line 20, in claim 1, delete "receiving" and insert --received--

In column 10, line 46, in claim 11, delete "sale" and insert --service--

In column 11, line 30, in claim 18, delete "sale" and insert --service--

In column 12, line 46, in claim 20, delete "sale" and insert --service--

Signed and Sealed this
Ninth Day of June, 2015

Michelle K. Lee
*Director of the United States Patent and Trademark Office*